United States Patent [19]

Shiraki et al.

[11] 4,386,125
[45] May 31, 1983

[54] FILM, SHEET OR TUBE OF A BLOCK COPOLYMER OR A COMPOSITION CONTAINING THE SAME

[75] Inventors: Toshinori Shiraki, Yamato; Susumu Hoshi, Yokohama; Fusakazu Hayano, Chigasaki, all of Japan

[73] Assignee: Asahi Kasei Kogyo Kabushiki Kaisha, Osaka, Japan

[21] Appl. No.: 349,863

[22] Filed: Feb. 18, 1982

[30] Foreign Application Priority Data

Feb. 20, 1981 [JP] Japan .................................. 56-22989
Apr. 28, 1981 [JP] Japan .................................. 56-63325
Jun. 22, 1981 [JP] Japan .................................. 56-95314

[51] Int. Cl.$^3$ ..................... C08F 297/04; C08L 53/02
[52] U.S. Cl. ........................................ 428/36; 525/71; 525/89; 525/96; 525/98; 525/314; 428/910
[58] Field of Search .................. 525/314, 98, 96, 93; 428/36

[56] References Cited

FOREIGN PATENT DOCUMENTS 49-102494 9/1974 Japan .
49-108177 10/1974 Japan .

*Primary Examiner*—Carman J. Seccuro

*Attorney, Agent, or Firm*—Birch, Stewart, Kolasch & Birch

[57] ABSTRACT

A film, sheet, or tube having an excellent low-temperature shrinkage suitable for use as, for example, a heat shrinkable label is disclosed. This film, sheet, or tube contains, as a base polymer, a block copolymer of an aromatic vinyl hydrocarbon polymer block and a polymer block composed mainly of a conjugated diene having the following structure:

| | | |
|---|---|---|
| (a) | $(A-B)_n$ | $n = 2-10$ |
| (b) | $A+B-A)_n$ | $n = 2-10$ |
| (c) | $B+A-B)_n$ | $n = 2-10$ |
| (d) | $[(B-A)_{\overline{m+2}}]X$ | $n = 2-10$ and $m = 1-10$ |
| (e) | $[(A-B)_{\overline{m+2}}]X$ | $n = 2-10$ and $m = 1-10$ |
| (f) | $[(B-A)_{\overline{n}}B-]_{\overline{m+2}}X$ | $n = 1-10$ and $m = 1-10$, or |
| (g) | $[(A-B)_{\overline{n}}A-]_{\overline{m+2}}X$ | $n = 1-10$ and $m = 1-10$ | wherein A is an aromatic vinyl hydrocarbon polymer block having a number-average molecular weight of 10,000 through 70,000, B is a polymer block composed mainly of a conjugated diene, and X is a residual group of a coupling agent or a polyfunctional initiator such as an organo polylithium compound, the weight ratio of the aromatic vinyl hydrocarbon to the conjugated diene being 60:40 through 95:5.

19 Claims, No Drawings

FILM, SHEET OR TUBE OF A BLOCK COPOLYMER OR A COMPOSITION CONTAINING THE SAME

The present invention relates to a transparent film, sheet or tube of a block copolymer or a block copolymer composition having an excellent low-temperature shrinkage and good mechanical properties.

Recently, shrink wrapping has been increasingly utilized, especially in the field of food wrapping, since it can clearly solve the problems of idling and wrinkling of a wrapping film, which problems cannot be avoided in the case of conventional shrink wrapping, and also since it makes possible the rapid and firm adherent wrapping of commercial products and of products having special shapes. Heretofore, vinyl chloride resins have widely been used as a base material for a shrink wrapping film or sheet since they have the required properties, such as low-temperature shrinkage, transparency, and mechanical properties. However, the developments of new materials suitable for use as a shrink wrapping film or sheet instead of vinyl chloride resins is greatly desired, since vinyl chloride resins involve hygienic problems stemming from the inclusion of a vinyl chloride monomer and plasticizers and a hydrogen chloride generating problem when they are incinerated.

Under these circumstances, block copolymer resins of aromatic vinyl hydrocarbons and conjugated dienes have begun to be widely used as food wrapping materials since they do not have the above-mentioned disadvantages of the vinyl chloride resins and since they have a good transparency and impact resistance. However, known block copolymers of aromatic vinyl hydrocarbons and conjugated dienes are not suitable for use in the field of shrink wrapping since they have a high orientation temperature and a high shrinkage temperature.

For instance, Japanese patent laid-open application Nos. 49-102494 and 49-108177 disclose biaxially oriented wrapping films of compositions containing (i) block copolymers having a styrene-type hydrocarbon content of 50 through 95% by weight and (ii) styrene resins. However, these films show a sufficient shrinkage factor only at a shrinkage temperature of approximately 100° C. or more.

Japanese patent publication Nos. 52-33667 and 55-5544 disclose the improvements in low-temperature shrinkage of the above-mentioned block copolymers. The former patent publication discloses a method for preparing films having a good low-temperature heat shrinkage in which linear copolymers are inflation oriented at a temperature range effectively producing a high degree of orientation by using a so-called tubular method with simultaneous biaxial orientation. This method has however, disadvantages in that, in order to obtain a film having a desired low-temperature shrinkage, the inflation orientation should be initiated within an extremely restricted temperature range depending upon the butadiene content of the starting resin and in that the temperature gradient of the film in an orientation zone between the starting and ending points of the inflation should be precisely controlled. Thus, the practical use of this proposed method is difficult. On the other hand, the latter patent publication discloses a method for preparing biaxially oriented films having a good low-temperature shrinkage in which 10 through 30% by weight of styrene-butadiene block copolymers having a styrene content of 20 through 50% are incorporated into styrene-butadiene block copolymers having a styrene content of 65 through 90%. This method has, however, disadvantages in that the desired low-temperature shrinkage cannot be obtained when the mixing conditions of both the block copolymers are not good and in that skilled techniques are required in the mixing of the block copolymers with each other. Thus, the practical use of this proposed method is also difficult.

Accordingly, objects of the present invention are to eliminate the above-mentioned problems of the prior art and to provide a film, sheet, or tube of a block copolymer having an excellent low-temperature shrinkage and which can be readily prepared.

Other objects and advantages of the present invention will be apparent from the following description.

In accordance with the present invention, there is provided a film, sheet, or tube or a block copolymer having an excellent low-temperature shrinkage of not less than 15% in terms of a heat shrinkage factor at 80° C. in at least one direction, comprising, as a base polymer, a block copolymer or any mixture thereof (i.e. a component (A)), said block copolymer having a melt flow of 0.001 through 70 g/10 min. and having the following structure:

| | | |
|---|---|---|
| (a) | $(A-B)_n$ | $n = 2-10$ |
| (b) | $A(B-A)_n$ | $n = 2-10$ |
| (c) | $B(A-B)_n$ | $n = 2-10$ |
| (d) | $[(B-A)_n]_{m+2}X$ | $n = 2-10$ and $m = 1-10$ |
| (e) | $[(A-B)_n]_{m+2}X$ | $n = 2-10$ and $m = 1-10$ |
| (f) | $[(B-A)_nB]_{m+2}X$ | $n = 1-10$ and $m = 1-10$, or |
| (g) | $[(A-B)_nA]_{m+2}X$ | $n = 1-10$ and $m = 1-10$ | wherein A is an aromatic vinyl hydrocarbon polymer block having a number-average molecular weight of 10,000 through 70,000, B is a polymer block composed mainly of a conjugated diene, and X is a residual group of a coupling agent or a polyfunctional initiator such as an organo polylithium compound, and weight ratio of the aromatic vinyl hydrocarbon to the conjugated diene being 60:40 through 95:5.

The films, sheets, or tubes of the block copolymer according to the present invention can be suitably used in shrink wrapping, especially in the wrapping of products and articles such as fresh food and plastic molded articles, which tend to result in denaturation and deformation upon heating at an elevated temperature for a long time during the shrink wrapping step.

The present invention will now be described in detail.

The block copolymers having the above-mentioned general structures (a)–(g) or any mixtures thereof are used in the present invention. The block copolymers having n and m in the above-mentioned general structures (a)–(g) smaller than the ranges defined above undesirably result in films, sheets, or tubes not having a good low-temperature shrinkage. Contrary to this, the block copolymers having n and m larger than the ranges defined above undesirably result in complicated and troublesome production steps and tend to simultaneously cause, for example, a deactivation reaction during the polymerization reaction.

The block copolymers usable in the present invention are: those having the general formula (a) in which n is 2 through 10, desirably 3 through 5 and more desirably 3 or 4; those having the general formula (b) or (c) in which n is 2 through 10, desirably 2 through 5 and more desirably 2 or 3; those having the general formula (d) or (e) in which n is 2 through 10, desirably 2 through 5 and more desirably 2 or 3, and m is 1 through 10, desirably 1 through 5 and more desirably 1 or 2 and those having the general formula (f) or (g) in which n is 1 through 10, desirably 1 through 5 and more desirably 1 or 2 and m is 1 through 10, desirably 1 through 5 and more desirably 1 or 2. The use of the block copolymers having the general structures (a) through (g) in which n and m are within the ranges specified above is desirable since not only the block copolymers can be relatively readily prepared but also since molded articles having an excellent low-temperature shrinkage, impact strength, and stiffness can be obtained.

The residual groups X of the coupling agents or polyfunctional initiators in the general formulas (a) through (g) are reaction residues of living polymers with polyfunctional compounds having at least two functional groups in the molecule thereof capable of reacting the active points of the living polymers. Examples of such functional groups are a halogen group, an epoxy group, an ester group, an acid anhydride group, a ketone group, an aldehyde group, an isocyanate group, an imino group, a vinyl group, and a vinylidene group. The polyfunctional compounds can contain at least two functional groups which can be the same or different. Typical examples of the polyfunctional compounds are chloroform, trichlorosilane, carbon tetrachloride, carbon tetrabromide, silane tetrachloride, silane tetrabromide, tin tetrachloride, tin tetrabromide, epoxidized hydrocarbon polymers (e.g. epoxidized polybutadiene), epoxidized vegetable oils (e.g. epoxidized soy bean oil and epoxidized linseed oil), carboxylic acid esters (e.g. diethyl succinate and glycerin stearate), acid anhydrides (e.g. maleic anhydride and syrene-maleic anhydride copolymers), divinyl benzene, and tetravinyl silane.

The aromatic vinyl hydrocarbon blocks in the block copolymers or mixtures thereof used in the present invention should have a number-average molecular weight of 10,000 through 70,000, desirably 15,000 through 60,000 and more desirably 20,000 through 50,000. The use of aromatic vinyl hydrocarbon blocks having a number-average molecular weight of less than 10,000 undesirably results in the block copolymers having a poor tensile strength and stiffness. Contrary to this, the use of aromatic vinyl hydrocarbon blocks having a number-average molecular weight of more than 70,000 undesirably makes orientation at a low temperature impossible, thereby resulting in poor low-temperature shrinkage.

There is no critical limitation in the molecular weight of the polymer blocks mainly composed of the conjugated dienes. Generally speaking, polymer blocks mainly composed of conjugated dienes having a number-average molecular weight of 500 through 200,000, desirably 1,000 through 100,000, are used in the present invention. The term "a polymer block mainly composed of a conjugated diene" herein used means a polymer block containing 50% by weight or more, desirably 70% by weight or more and more desirably 90% by weight or more, of the conjugated diene. The remainder in the polymer block is an aromatic vinyl hydrocarbon, which can be distributed in the polymer block uniformly or in a tapered form.

Furthermore, a copolymer segment containing more than 50% by weight of the aromatic vinyl hydrocarbon may be present between the aromatic vinyl hydrocarbon polymer block and the polymer block mainly composed of the conjugated diene. In this case, said copolymer segment is regarded as being included in the polymer block mainly composed of the conjugated diene.

The weight ratio of the aromatic vinyl hydrocarbon to the conjugated diene contained in the block copolymer according to the present invention should be 60:40 through 95:5, desirably 68:32 through 90:10 and more desirably 70:30 through 85:15. Block copolymers having an aromatic vinyl hydrocarbon content of less than 60% by weight result in undesirable films, sheets, or tubes having a poor tensile strength and stiffness, whereas those having an aromatic vinyl hydrocarbon content of more than 95% by weight results in undesirable films, sheets, or tubes having a poor impact strength.

Especially desirable block copolymers according to the present invention are those having a polymer block substantially composed of a conjugated diene homopolymer. The term "a polymer block substantially composed of a conjugated diene homopolymer" used herein means a block copolymer containing a small amount of aromatic vinyl hydrocarbon in the polymer block mainly composed of the conjugated diene. That is to say, it means that the block copolymer contains a small amount of the aromatic vinyl hydrocarbon not contained in the aromatic vinyl hydrocarbon polymer block and, more specifically, has the non-block percentage defined below of not more than 15% by weight, desirably not more than 10% by weight and more desirably not more than 5% by weight.

$$\text{Non-block percentage (\%)} = \frac{\left(\begin{array}{c}\text{Total weight of aromatic}\\\text{vinyl hydrocarbon in}\\\text{block copolymer}\end{array}\right) - \left(\begin{array}{c}\text{Weight of aromatic vinyl}\\\text{hydrocarbon polymer block}\\\text{in block copolymer}\end{array}\right)}{\left(\begin{array}{c}\text{total weight of aromatic vinyl}\\\text{hydrocarbon in block copolymer}\end{array}\right)} \times 100$$

The weight of the aromatic vinyl hydrocarbon polymer block in the block copolymer can be quantitatively determined by, for example, a method in which the block copolymer is oxidatively decomposed in the presence of a di-tert-butylhydroperoxide catalyst with osmium tetraoxide (for example, according to a method described by L. M. Kolthoff et al, J. Polym. Sci. 1, 429, 1946). Block copolymers having a small non-block percentage desirably result in films, sheets, or tubes having an excellent stiffness.

Block copolymers according to the present invention can basically be prepared by means of conventional polymerization techniques disclosed in, for example, Japanese patent publication Nos. 36-19286, 43-14979, 49-36957, 48-2423, and 48-4106. It should be noted, however, that the production conditions should be selected so that the number-average molecular weight of the aromatic vinyl hydrocarbon polymer block and the aromatic vinyl hydrocarbon content are within the above-mentioned ranges.

Block copolymers having the general structures (a) through (g) but n or m outside of the range defined above can also be used, together with the block copolymers of the present invention defined above, in the present invention as long as the compounded amount of the former block copolymer is less than 50% by weight, desirably 30% by weight or less. However, in this case, it should also be noted that the number-average molecular weight of the aromatic vinyl hydrocarbon polymer block in the block copolymer having a structure outside of the structure defined in the present invention is desirably within the range defined above since the molded articles have an excellent low-temperature shrinkage.

Examples of the aromatic vinyl hydrocarbons usable in the present invention are styrene, o-methylstyrene, p-methylstyrene, p-tert-butyl styrene 1,3,-dimethylstyrene, α-methylstyrene, vinyl naphthalene, and vinyl anthracene. The most preferred one is styrene. These aromatic hydrocarbons may be used alone or in any mixture thereof.

Examples of the conjugated dienes are diolefins having several conjugated double bonds, such as 1,3-butadiene, 2-methyl-1,3-butadiene, 1,3-pentadiene, and 1,3-hexadiene. The most preferred conjugated dienes are 1,3-butadiene and isoprene. These dienes may be used alone or in any mixture thereof.

The block copolymers or mixtures thereof used in the present invention should have a melt flow of 0.001 through 70 g/10 min., desirably from 0.1 through 50 g/10 min. and more desirably 1 through 40 g/10 min., as measured by a method according to JIS (i.e. Japanese Industrial Standard)-K-6870 at 200° C. under a load of 5 kg. The block copolymers or mixtures thereof having the above-mentioned melt flow range have an excellent moldability when films, sheets, or tubes are molded.

The block copolymers or mixtures thereof used in the present invention can be modified by hydrogenation, halogenation, halogenated hydronation, or epoxidation or by the inclusion of functional groups such as hydroxy groups, thiol groups, nitrile groups, sulfone groups, carboxyl groups, and amino groups by chemical reactions to such an extent that basic characteristics such as low-temperature shrinkage and stiffness are not impaired.

Low-molecular weight aromatic vinyl hydrocarbon polymers or copolymers (i.e. the component (B)) having a number-average molecular weight of not more than 20,000, desirably 200 through 10,000 and more desirably 300 through 6000, can be incorporated into the block copolymers having the general structures (a) through (g) or mixtures thereof (i.e. the component (A)) to further improve low-temperature shrinkage. These compositions can be used as a base polymer in the present invention.

The incorporation of the component (B) having a number-average molecular weight of more than 20,000 undesirably results in no substantial amount of the improvement in low-temperature shrinkage. The most desirable component (B) are those having a number-average molecular weight of not less than 300 but less than 500, since these low-molecular weight polymers or copolymers afford extremely good improvement effect to low-temperature shrinkage.

The component (B) (i.e. the above-mentioned low molecular weight polymers or copolymers) can be compounded into the component (A) in an amount of 5 through 100 parts by weight, desirably 10 through 70 parts by weight and more desirably 15 through 55 parts by weight, based on 100 parts by weight of the component (A). In the case where the compounded amount of the component (B) is less than 5 parts by weight, a sufficient improvement in low-temperature shrinkage cannot be obtained. Contrary to this, in the case where the compounded amount of the component (B) is more than 100 parts by weight, the impact strength is undesirably decreased.

Furthermore, the aromatic vinyl hydrocarbon polymers or copolymers (i.e. the component (C)) having a number-average molecular weight of not less than 30,000, desirably 50,000 through 1,000,000 and more desirably 80,000 through 500,000, can also be incorporated, together with the above-mentioned component (B), into the component (A) to further improve low-temperature shrinkage and stiffness. These compositions can be used as a base polymer in the present invention. The incorporation of the component (C) having a number-average molecular weight of less than 30,000 undesirably results in insufficient improvement of the stiffness.

The component (C) (i.e. the above-mentioned aromatic vinyl hydrocarbon polymers or copolymers) can be compounded into the component (A) in an amount of 5 through 80 parts by weight, desirably 10 through 60 parts by weight and more desirably 15 through 45 parts by weight, based upon 100 parts by weight of the component (A). In the case where the compounded amount of the component (C) is less than 5 parts by weight, the effect of improvement in the stiffness is insufficient. Contrary to this, in the case where the compounded amount of the component (C) is more than 80 parts by weight, it is not desirable that the low-temperature shrinkage becomes worse and the impact strength is decreased.

The aromatic vinyl hydrocarbon polymers or copolymers used as the components (B) and (C) in the present invention include, in addition to the homopolymers or copolymers of the above-mentioned aromatic vinyl hydrocarbon monomers, copolymers of the above-mentioned aromatic vinyl hydrocarbon monomers with other vinyl monomers such as ethylene, propylene, butylene, vinyl chloride, vinylidene chloride, vinyl acetate, acrylates (e.g. methyl acrylate), methacrylates (e.g. methyl methacrylate), and acrylonitrile. Furthermore, a rubber modified high impact polystyrene (HIPS), an acrylonitrile-butadiene-styrene copolymer (ABS), a methacrylate-butadiene-styrene copolymer (MBS) and the like can also be used, as the component (C), in the present invention. Especially desirable aromatic vinyl hydrocarbon polymers or copolymers are the homopolymer of styrene (i.e. polystyrene), a styrene-α-methylstyrene copolymer, a styrene-methyl methacrylate copolymer, and a styrene-acrylonitrile copolymer, and a rubber modified high impact polystyrene.

The base polymers used in the present invention can include various additives depending upon their application purposes. Examples of suitable additives are softening agents and plasticizers such as cumarone-indene resin, a terpene resin, and oils in an amount of 30 parts by weight or less based on 100 parts by weight of the base polymer. In addition, various stabilizing agents, pigments, antiblocking agents, antistatic agents, slip agents, lubricants, and other conventional additives can also be used. Examples of antiblocking agents, slip agents or lubricants are liquid paraffin, synthetic paraffin, mineral oils, petrolatum, petroleum wax, polyethylene wax, hydrogenated polybutene, higher fatty acids and the metal salts thereof, linear fatty alcohols, glycerine, sorbitol, propylene glycol, fatty acid esters of monohydroxy or polyhydroxy alcohols, phthalates, hydrogenated castor oil, beeswax, acetylated monoglyceride, hydrogenated sperm oil, ethylenebis fatty acid esters, higher fatty amides, stearyl erucamide, oleyl palmitamide, silicone oil, and inorganic fillers (e.g. oxides, hydroxides, carbonates, sulfates, silicates of magnesium, aluminum, silicon, calcium, titanium and the like, clay, diatomaceous earth, and kaolin). Examples of antistatic agents are glycerine fatty acid esters, sorbitan fatty acid esters, propylene glycol fatty acid esters, stearyl citrate, pentaerythritol fatty acid esters, polyglycerine fatty acid esters, polyoxyethylene glycerine fatty acid esters, polyoxyethylene sorbitan fatty acid esters, polyethylene glycol fatty acid esters, polypropylene glycol fatty acid esters, polyoxyethylene alkylphenyl ethers, N,N-bis(2-hydroxyethyl)alkyl amines, the condensation products of fatty acids and diethanol, the block copolymer of polyoxypropylene and polyoxyethylene, polyethylene glycol, polypropylene glycol, and anion surface active agents (e.g. alkyl sulfonates and alkylbenzene sulfonates). These antiblocking agents, slip agents, lubricants, and antistatic agents can be added to the base polymer in an amount of 0.01 through 5 parts by weight, more desirably 0.05 through 2 parts by weight, based on 100 parts by weight of the base polymer.

The components (A) and (B), or the components (A), (B) and (C) and, optionally, the base polymer and various additives can be mixed together by using any conventional mixing or blending techniques. For example, melt blending methods using conventional mixing or blending apparatus such as open rolls, intensive mixers, internal mixers, co-kneaders, continuous kneaders provided with biaxial rotors, and extruders can be used. Furthermore, the mixing can be also effected by mixing the solution or dispersion of each component in a solvent, followed by the removal of the solvents in any known manner.

The heat shrinkable films, sheets, or tubes of the present invention can be prepared from the above-mentioned based polymer substantially in accordance with conventional techniques which are heretofore used to impart heat shrinkage to films, sheets, or tubes of vinyl chloride resins. The films, sheets, or tubes according to the present invention should have a heat shrinkage factor at 80° C. of not less than 15%, desirably 20 through 90% and more desirably 40 through 80%. The films, sheets, or tubes having a heat shrinkage factor at 80° C. of less than 15% have a poor low-temperature shrinkage so that there are disadvantages in that an elevated temperature and long-term heating result in undesirable denaturation and deformation of the products or articles to be wrapped and also result in a decrease in the shrink wrapping capacity are required in the shrink wrapping step. The term "a heat shrinkage factor at 80° C." means the heat shrinkage factor of the molded articles (i.e. the films, sheets, or tubes) when the molded articles are dipped at a temperature of 80° C. in a heating medium such as hot water, silicone oil, or glycerine, none of which adversely affects the molded articles and is obtained from the following equation:

$$\text{Heat shrinkage factor (\%)} = \frac{l - l'}{l} \times 100$$

wherein
  l: length before shrinkage
  l': length after shrinkage

The films, sheets, or tubes according to the present invention can be obtained by orienting the above-mentioned base polymer in at least one direction, usually in accordance with a conventional uniaxial or biaxial orientation technique. For example, the base polymers are extruded through a conventional T-die or ring die at a temperature of 160° through 250° C., desirably 180° through 220° C., to form non-oriented flat or tubular extrudates, which are in turn subjected to uniaxial or biaxial orientation. In the case of uniaxial orientation, films or tubes are oriented in the machine direction (i.e. MD) by, for example, calender rolls or are oriented in the direction perpendicularly intersecting the machine direction (i.e. the transverse direction:TD) by, for example, tenters, and the extruded tubes are oriented in the machine direction or the circumferential direction. In the case of biaxial orientation, the extruded films or tubes are first oriented in the machine direction by, for example, metallic rolls and then are oriented in the transverse direction by, for example, tenters, and the extruded tubes are simultaneously or separately oriented both in the machine direction and the circumferential direction (i.e. the direction perpendicularly intersecting the axis of the extruded tubes). The orientation can be preferably carried out at a temperature of 60° through 120° C., desirably 70° through 110° C. and more desirably 80° through 100° C., at a draw ratio in the machine and/or transverse direction of 1.5 through 8 times, desirably 2 through 6 times. An orientation temperature of less than 60° C. tends to cause rupture during orientation, thereby causing undesirable products to be formed. Contrary to this, an orientation temperature of more than 120° C. tends to result in difficulty in forming the desired products having a good low-temperature shrinkage.

The draw ratio can be optionally determined to afford the desired shrinkage factor, depending upon the usage of the products. However, a draw ratio of less than 1.5 tends to result in the formation of oriented products having a small heat shrinkage factor and which cannot be desirably used as a heat shrink wrapping material. Contrary to this, a draw ratio of more than 8 is not desirable from the point of view of a stable, continuous operation in the orientation step. In the case of biaxial orientation, the draw ratios of the machine and transverse directions may be the same or different. The oriented products obtained in the uniaxial or biaxial orientation step can be subjected to, optionally after cooling, a heat treatment at a temperature of from 60° to 100° C. for a short period, such as 3 through 60 sec and desirably 10 through 40 sec, to prevent natural shrinkage at room temperature. Thus, according to the present invention, uniaxially oriented films, sheets, or tubes having a heat shrinkage factor at 80° C. in one direction of not less than 15% and in the direction perpendicularly intersecting said one direction of less than 15% can be obtained by uniaxial orientation. Furthermore, according to the present invention, biaxially oriented films, sheets, or tubes having a heat shrinkage factor at 80° C. in one direction and in the direction perpendicularly intersecting said one direction of not less than 15% can be obtained.

The desirable films, sheets, or tubes of the present invention suitable for use as a heat shrink wrapping material have a tensile modulus of 7000 kg/cm² or more, desirably 10,000 kg/cm² or more and more desirably 13,000 kg/cm² or more. Films, sheets, or tubes having a tensile modulus of less than 7000 kg/cm² tend to cause distortion in the shrink wrapping step, thereby rendering the wrapping undesirable.

Especially when the base polymer comprising the components (A), (B) and (C) is used, films, sheets, or tubes having a tensile modulus in at least one direction of 10,000 kg/cm², desirably 13,000 kg/cm² or more and more desirably 15,000 kg/cm² or more, can be readily obtained by changing the composition of each component. Therefore, the base polymer comprising the components (A), (B) and (C) can highly respond to various requirements of final use applications.

The films, sheets, or tubes of the present invention can be heat shrunk by heating them at a temperature of 130° through 300° C., desirably 150° through 250° C., for few seconds through several minutes, for example 1 through 60 sec, desirably 2 through 20 sec, to obtain the desired heat shrinkage factor when they are used as a heat shrink wrapping material.

The films, sheets, or tubes of the present invention are hygienically superior to the conventional vinyl chloride resin type materials so that they can suitably be used in every field where heat shrink wrapping is utilized, such as the heat shrink wrapping of fresh food products, frozen food products, confectionaries, clothing, stationery, toys, etc.

Furthermore, the uniaxially oriented films, sheets or tubes of the present invention having a heat shrinkage factor at 80° C. in one direction of not less than 15%, desirably 20 through 90% and more desirably 40 through 80%, a heat shrinkage factor at 80° C. in the direction perpendicularly intersecting said one direction of less than 15%, desirably not more than 10% and more desirably not more than 5%, and a tensile modulus in at least one direction of not less than 7,000 kg/cm², desirably not less than 10,000 kg/cm² and more desirably not less than 15,000 kg/cm², can be suitably used as a so-called heat-shrinkable labelling material. That is to say, letters, graphic designs, marks, patterns, and the like can be printed on the surface of the films, sheets, or tubes beforehand and then the films, sheets, or tubes can be used to adhesively wrap articles such as plastic molded articles, metallic products, and porcelains by heat shrink wrapping. Especially, since the uniaxially oriented films, sheets, or tubes of the present invention have an excellent low-temperature shrinkage, they can be desirably used as a shrinkable labelling material for plastic articles which are deformed when heated at an elevated temperature. Furthermore, these shrinkable labels obtained from the films, sheets, or tubes can also be used as a coating material for preventing the scattering of broken pieces of various types of glass vessels or containers.

The present invention will now be further illustrated by, but is by no means limited to, the Examples set forth hereinbelow.

EXAMPLE 1, 2 AND COMPARATIVE EXAMPLE 1

The styrene-butadiene block copolymers having the polymer structures, the styrene contents and the number-average molecular weight (Mn) of the polystyrene blocks listed in Table 1 below were polymerized in n-hexane by using a n-butyllithium initiator.

These copolymers were molded in the form of sheets by a 40 mm φ extruder and, then, the molded sheets were uniaxially oriented at a draw ratio of 3.5 times at the various orientation temperatures shown in Table 1 to form the films having a thickness of approximately 80 microns.

The results are shown in Table 1 below.

TABLE 1

|  |  | Example 1 | Example 2 | Comparative Example 1 |
|---|---|---|---|---|
| Polymer composition | Polymer Structure*¹ | (B—S)₃ | (B—S)₃ | B—S |
|  | Styrene Content (Wt %) | 80 | 80 | 80 |
|  | Mn of polystyrene block (× 10⁻⁴) | 2.5 | 4.5 | 8.5 |
| Orientation*² Temp. (°C.) | 90 | o | x | x |
|  | 95 | o | o | x |
|  | 105 | o | o | x |
|  | 125 | o | o | o |
| Heat shrinkage factor at 80° C. (%)*³ |  | 53 | 45 | <1 |

*¹B: Polybutadiene block
S: Polystyrene block
*²Draw rate: 1.0 m/min.
o ... Orientation possible
x ... Orientation impossible
*³The oriented films were dipped in silicone oil at a temperature of 80° C. for 5 min. and calculated from the following equation.

Heat shrinkage factor (%) = $\frac{l - l'}{l} \times 100$ l: length before shrinkage
l': length after shrinkage As is clear from the results shown in Table 1, since the copolymers of Examples 1 and 2 having the number-average molecular weight within the range defined in the present invention have lower orientation temperatures and larger heat shrinkage factors as compared with that of the Comparative Example 1, the copolymers of Examples 1 and 2 are extremely excellent for use as a shrinkable film.

The heat shrinkage factors of the oriented films of Examples 1 and 2 shown in Table 1 are the results obtained from the films oriented at 90° C. and 95° C., respectively. However, the heat shrinkage factors at 80° C. of the films obtained from the copolymers of Examples 1 and 2 and oriented at 125° C. were about 5%, which are inferior to those of the films oriented at 90° C. Thus, it is observed that the block copolymers defined in the present invention cannot afford good low-temperature shrinkage unless they are oriented at an orientation temperature within the range defined in the present invention.

EXAMPLES 3-5 AND COMPARATIVE EXAMPLES 2-5

The styrene-butadiene block copolymers having the polymer structures, the styrene contents and the number-average molecular weight (Mn) of the polystyrene blocks listed in Table 2 below were prepared as in Example 1. The polystyrene of Comparative Example 5 was polymerized in cyclohexane by using n-butyllithium initiator. The sheets were molded from the resultant copolymers (or polymer) as in Example 1 and, then, uniaxially oriented under the conditions as shown in Table 2. As the orientation temperatures, the minimum temperatures necessary to effect the orientation of the copolymers (or polymer) sheets were selected.

The results are shown in Table 2 below.

TABLE 2

|  |  | Comparative Example | | | | Example | | |
| --- | --- | --- | --- | --- | --- | --- | --- | --- |
|  |  | 2 | 3 | 4 | 5 | 3 | 4 | 5 |
| Polymer composition | Polymer structure | (B—S)$_5$ | B—S | (B—S)$_3$ | PS | (B—S)$_3$ | (B—S)$_3$ | (B—S)$_8$ |
|  | Styrene content (wt %) | 80 | 80 | 50 | 100 | 75 | 80 | 80 |
|  | Mn of polystyrene block ($\times 10^{-4}$) | 0.5 | 8.5 | 2.5 | 10 | 2.5 | 2.5 | 4.5 |
| Orientation conditions | Temperature (°C.) | 70 | 125 | 75 | 130 | 85 | 90 | 95 |
|  | Rate (m/min) | ← | ← | ← | 1.0 | → | → | → |
|  | Ratio (times) | ← | ← | ← | 3.5 | → | → | → |
| Physical properties of oriented film | Thickness (μ) | ← | ← | ← | 80 | → | → | → |
|  | Tensile strength (kg/cm$^2$)*4 | 380 | 600 | 320 | 700 | 410 | 470 | 530 |
|  | Tensile modulus (%)*4 | 5000 | 22000 | 2000 | 27000 | 12000 | 16000 | 19000 |
|  | Cloudiness (%)*5 | <1 | <1 | <1 | <1 | <1 | <1 | <1 |
|  | Dart impact strength (kg-cm/mm)*6 | 3 | 2 | 55 | 1 | 18 | 10 | 7 |
|  | Shrinkage factor at 80° C. (%) | 70 | <1 | 70 | <1 | 65 | 53 | 45 |

*4 According to JIS-K-6732 (measured in an orientation direction)
*5 According to JIS-K-6714
*6 According to ASTM-G-1709

As is clear from the comparison of the results of Examples 3–5 of the present invention with those of Comparative Examples 2–5, the copolymer of Comparative Example 4 having a styrene content of 50% which is smaller than the range defined in the present invention have a low tensile strength and tensile modulus and also have a poor stiffness as a shrink label, whereas the polymer of Comparative Example 5 having a styrene content higher than the range defined in the present invention has undesirably small heat shrinkage and a poor impact strength. Furthermore, the copolymer of Comparative Example 2 having a Mn of the polystyrene block smaller than the range defined in the present invention has a low tensile strength and tensile modulus, whereas the copolymer of Comparative Example 3 having a Mn of the polystyrene block larger than the range defined in the present invention has a low heat shrinkage factor. Thus, the block copolymer films according to the present invention have an excellent film properties and heat shrinkage property.

The melt flow of the block copolymers of Examples 3, 4 and 5 were 10, 18 and 2 g/10 min, respectively. The heat shrinkage factors at 80° C. of the uniaxially oriented films of Examples 3 through 5 in the direction perpendicularly intersecting the orientation direction were less than approximately 5%.

EXAMPLES 6–8 AND COMPARATIVE EXAMPLES 6–9

The copolymers listed in Table 3 below were extruded in the form of sheets by using a 40 mmφ extruder having a L/D of 24 and, then, the resultant sheets were biaxially oriented by using a biaxial orientation apparatus (manufactured by Iwamoto Seisakusho, Japan). The cylinder temperatures of the extruder were 150 through 210° C., the temperature of the T-die was 200° C. and the thickness of the T-die slit was 0.6 mm. The copolymers in the form of sheets extruded from the T-die were also oriented by using the biaxial orientation apparatus. The minimum temperatures necessary to orient the copolymers were selected as the orientation temperatures.

The heat shrinkage factors were measured by dipping the samples each having a dimension of 10 cm × 10 cm into silicone oil at a temperature of 80° C. for 5 min. The block copolymers of Examples 6, 7 and 8 are the same as those of Examples 3, 4 and 5, respectively.

The results are shown in Table 3 below.

TABLE 3

|  |  |  | Example | | | Comparative Example | | | |
| --- | --- | --- | --- | --- | --- | --- | --- | --- | --- |
|  |  |  | 6 | 7 | 8 | | 6 | 7 | 8 |
| Polymer composition | Polymer Structure |  | (B—S)$_3$ | (B—S)$_3$ | (B—S)$_3$ | | (B—S)$_5$ | B—S | (B—S)$_3$ |
|  | Styrene content (wt %) |  | 75 | 80 | 80 | | 80 | 80 | 50 |
|  | Mn of polystyrene block ($\times 10^{-4}$) |  | 2.5 | 2.5 | 4.5 | | 0.5 | 8.5 | 2.5 |
| Orientation conditions | Temperature (°C.) |  | 85 | 90 | 95 | | 70 | 125 | 75 |
|  | Rate (m/min) |  | ← | ← | ← | | 5 | → | → |
|  | Ratio (times) |  | ← | ← | ← | MD | 3.5 | → | → |
|  |  |  |  |  |  | TD | 3.5 |  |  |
| Physical properties of oriented film | Thickness (μ) |  |  |  |  | | 50 |  |  |
|  | Tensile strength (kg/cm$^2$) | MD | 380 | 470 | 570 | | 310 | 620 | 230 |
|  |  | TD | 350 | 450 | 520 | | 290 | 580 | 200 |
|  | Tensile modulus (kg/cm$^2$) | MD | 10500 | 13500 | 18200 | | 4200 | 20600 | 2800 |
|  |  | TD | 11000 | 15000 | 19000 | | 5900 | 22000 | 3200 |
|  | Haze (%) |  | 1 | 1 | 1 | | 3 | 1 | 1 |
|  | Dart impact strength (kg-cm/mm) |  | 14 | 7 | 5 | | 2 | 1 | 45 |
|  | Heat shrinkage factor at 80° C. (%) | MD | 67 | 55 | 48 | | 75 | 1 | 75 |
|  |  | TD | 64 | 53 | 42 | | 72 | 1 | 74 |

EXAMPLES 9–14 AND COMPARATIVE EXAMPLE 10

The (B'-S)$_3$ type block copolymers having various non-block percentages (%) listed in Table 4 below were prepared by copolymerizing butadiene and a portion of styrene. The physical properties of the oriented films obtained therefrom and the heat shrinkage factors thereof are shown in Table 4 below. The number-average molecular weights of the polystyrene blocks of these copolymers were 20,000 through 40,000.

As is clear from the results shown in Table 4 below, as the non-block percentages are increased, the tensile strengths and the tensile moduli tend to be improved.

Although attempts were made to obtain the biaxially oriented films of the block copolymer having the same structure as those of Examples 9 through 14 but having a high melt flow as Comparative Example 10, good films were not able to be obtained due to the fact that the oriented film ruptured during the orientation.

The heat shrinkage factors at 80° C. of the uniaxially oriented films of Examples 9 through 11 in the direction perpendicularly intersecting the orientation direction were less than approximately 5%.

As is clear from the results of Example 15, the blend of the radial type and the linear type block copolymers results in the oriented film having excellent physical properties and heat shrinkage factor, since the characteristics of the block copolymer and the orientation conditions are within the range defined in the present invention.

The heat shrinkage factors at 80° C. of the uniaxially oriented films of Examples 15 through 19 in the direction perpendicularly intersecting the orientation direction were less than 5%.

TABLE 4

| | | Example | | | | | | Comparative Example |
|---|---|---|---|---|---|---|---|---|
| | | 9 | 10 | 11 | 12 | 13 | 14 | 10 |
| Polymer composition | Polymer structure* | (B'—S)$_3$ | (B'—S)$_3$ | (B'—S)$_3$ | (B'—S)$_3$ | (B'—S)$_3$ | (B'—S)$_3$ | (B'—S)$_3$ |
| | Styrene content (wt %) | | ← 85 → | | | ← ← 85 → → | | |
| | Melt index (g/10 min) | 4.5 | 5.2 | 5.6 | 4.5 | 5.2 | 5.6 | 80 |
| | Non-block percentage (%) | 20 | 7 | 3 | 20 | 7 | 3 | 8 |
| Orientation conditions | Temperature | 90 | 95 | 95 | 90 | 95 | 95 | — |
| | Rate (m/min) | | ← 1.0 → | | | ← ← 5 → → | | |
| | Ratio (times) | | ← 4.0 → | | | ← ← MD 3.5 TD 3.5 → → | | |
| Physical properties of oriented film | Thickness ($\mu$) | | ← 60 → | | | ← ← 50 → → | | |
| | Tensile strength (kg/cm$^2$) | 450 | 520 | 550 | MD 480 TD 440 | MD 510 TD 490 | MD 540 TD 495 | Good biaxially oriented film could not be obtained. |
| | Tensile modulus (kg/cm$^2$) | 15000 | 17500 | 20000 | MD 12000 TD 14500 | MD 15200 TD 16500 | MD 18500 TD 19000 | |
| | Cloudiness (%) | <1 | <1 | <1 | <1 | <1 | <1 | |
| | Dart impact strength (kg-cm/mm) | 13 | 9 | 7 | 10 | 7 | 5 | |
| Heat shrinkage factor at 80° C. (%) | | 65 | 55 | 52 | MD 63 TD 60 | MD 51 TD 49 | MD 52 TD 50 | |

*B': Copolymer block of butadiene and styrene

TABLE 5

| | | Example | | | | |
|---|---|---|---|---|---|---|
| | | 15 | 16 | 17 | 18 | 19 |
| Polymer composition | Polymer structure | [(S—B)$_2$]$_3$Si (S—B)$_2$S | [(S—B$_2$)]$_4$-Si | (S—B)$_2$-S | (B—S)$_4$ | (B—S—B)$_4$-Si |
| | Sytrene content (wt %) | 82 | 82 | 70 | 85 | 80 |
| | Mn of polystyrene block (× 10$^{-4}$) | 2.5 | 2.5 | 3.0 | 2.0 | 4.0 |
| | Non-block percentage (%) | 3 | 2 | 3 | 2 | 1> |
| Orientation conditions | Temperature (°C.) | 90 | 90 | 90 | 85 | 90 |
| | Rate (m/min) | ← | ← | 1.5 | → | → |
| | Ratio (times) | ← | ← | 3.5 | → | → |
| Physical properties of oriented film | Thickness ($\mu$) | | | 50 | | |
| | Tensile strength (kg/cm$^2$) | 480 | 520 | 405 | 525 | 550 |
| | Tensile modulus (kg/cm$^2$) | 15500 | 19000 | 10000 | 19500 | 18000 |
| | Haze (%) | <1 | <1 | <1 | <1 | <1 |
| | Dart impact strength (kg-cm/mm) | 6 | 5 | 20 | 9 | 5 |
| | Heat shrinkage factor at 80° C. (%) | 55 | 52 | 49 | 62 | 50 |

EXAMPLES 15-19

The styrene-butadiene block copolymers having the polymer structures, the styrene contents and the number-average molecular weights (Mn) of the polystyrene blocks as shown in Table 5 below and having melt flows within the range of 5 through 30 g/10 min were uniaxially oriented as in Example 1. The results of the physical properties of the oriented films and the heat shrinkage factors are shown in Table 5 below.

The radial type styrene-butadiene block copolymers of Examples 15 and 16 were prepared by polymerizing styrene and butadiene in cyclohexane by using a n-butyllithium initiator to form (S-B)$_2$Li, followed by coupling with a SiCl$_4$ coupling agent. In Example 15, Si(CH$_3$)$_2$Cl$_2$ was also used, together with SiCl$_4$ as the coupling agent, whereby the radial type and the linear type block copolymers were coexistent in the resultant block copolymer.

EXAMPLES 20-22

The copolymers shown in Table 6 below were biaxially oriented by using an inflation method.

The inflation films were prepared by using a 30 mm$\phi$ extruder provided with a 60$\phi$ die under the conditions of a die temperature of 190° C., a draw ratio of 2.5 in the machine direction (MD) and 4 in the transverse direction (TD) and a draw speed of 20 m/min. The thicknesses of the resultant films were approximately 30 microns.

The physical properties of the resultant oriented films are shown in Table 6 below.

As is clear from the results shown in Table 6, the oriented films having the physical properties and heat shrinkage factors of the films can be obtained according to an inflation method, so long as the characteristics of the block copolymers and the orientation conditions are within the range defined in the present invention.

TABLE 6

|  |  |  | Example 20 | Example 21 | Example 22 |
|---|---|---|---|---|---|
| Polymer composition | Polymer structure |  | $(B-S)_3$ | $(B'-S)_3$ | $[(S-B)_{2}]_4-Si$ |
|  | Styrene content (wt %) |  | 80 | 85 | 82 |
|  | Mn of polystyrene block ($\times 10^{-4}$) |  | 2.5 | 3.3 | 2.5 |
|  | Non-block percentage (%) |  | 3 | 7 | 2 |
| Physical properties of oriented film | Thickness ($\mu$) |  | 31 | 29 | 32 |
|  | Tensile strength (kg/cm$^2$) | MD | 450 | 480 | 460 |
|  |  | TD | 430 | 450 | 440 |
|  | Tensile modulus (kg/cm$^2$) | MD | 13000 | 14800 | 12200 |
|  |  | TD | 14000 | 15300 | 13500 |
|  | Haze (%) |  | <1 | <1 | <1 |
|  | Dart impact strength (kg-cm/mm) |  | 8 | 7 | 4 |
|  | Heat shringkage factor at 80° C. | MD | 48 | 46 | 50 |
|  |  | TD | 68 | 70 | 72 |

EXAMPLES 23–25 AND COMPARATIVE EXAMPLE 11

The biaxially oriented sheets of the block copolymers having the polymer composition listed in Table 7 below were prepared and the physical properties thereof were determined. The results are shown in Table 7 below.

The block copolymers had a melt flow of 0.5 through 30 g/10 min and a non-block percentage of 5% or less.

EXAMPLES 26–42 AND COMPARATIVE EXAMPLES 12–14

The block copolymer compositions having the styrene-butadiene block copolymer compositions shown in Table 8 were prepared by using the styrene-butadiene block copolymers of the previous Examples and the polystyrenes having different number-average molecular weights (Mn) and molded to sheets by using a 40 mm$\phi$ extruder. Thereafter, the uniaxially or biaxially oriented films were prepared from the sheets obtained above under the orientation conditions shown in Table 8.

The physical properties of the oriented films are shown in Table 8. The heat shrinkage factors at 80° C. in the direction perpendicularly intersecting the orientation direction of the uniaxially oriented films of Table 8 were less than 5%.

TABLE 7

|  |  | Comparative Example 11 | Example 23 |  | Example 24 | Example 25 |
|---|---|---|---|---|---|---|
| Polymer composition | Polymer structure | B—S | $(B-S)_3$ |  | $(B-S)_5$ | $(B-S)_8$ |
|  | Styrene content (wt %) | ← | ← | 85 | → | → |
|  | Mn of polystyrene block ($\times 10^{-4}$) | 13.6 | 4.5 |  | 2.7 | 1.7 |
| Orientation conditions | Temperature (°C.) | 130 | 95 |  | 90 | 80 |
|  | Rate (m/min) | ← | ← | 1 | → | → |
|  | Ratio | ← | ← | MD 3.0 TD 3.0 | → | → |
| Physical properties of oriented sheet | Thickness (mm) | ← | ← | 0.5 | → | → |
|  | Tensile strength (kg/cm$^2$) |  |  |  |  |  |
|  | MD | 670 | 580 |  | 560 | 520 |
|  | TD | 650 | 575 |  | 555 | 510 |
|  | Tensile modulus (kg/cm$^2$) |  |  |  |  |  |
|  | MD | 22000 | 20000 |  | 16500 | 14000 |
|  | TD | 22500 | 19500 |  | 16500 | 14000 |
|  | Heat shrinkage factor at 80° C. (%) |  |  |  |  |  |
|  | MD | <1 | 36 |  | 50 | 57 |
|  | TD | <1 | 35 |  | 48 | 55 |

TABLE 8

| | | | 26 | 27 | 28 | 29 | 30 | Example 31 | 32 | 33 | 34 | 35 | 36 |
|---|---|---|---|---|---|---|---|---|---|---|---|---|---|
| Styrene-butadiene block copolymer | Polymer structure | | (B—S)$_3$ | (B—S)$_3$ | (B—S)$_3$ | (B—S)$_3$ | (B—S)$_3$ | (B—S)$_3$ | (B—S)$_3$ | (B—S)$_8$ | (B—S)$_3$ | (B—S)$_3$ | (B—S)$_8$ |
| | Styrene content (wt %) | | 80 | 80 | 80 | 80 | 80 | 80 | 80 | 80 | 80 | 70 | 80 |
| | Mn of polystyrene block ($\times 10^{-4}$) | | 4.0 | 4.0 | 4.0 | 4.0 | 4.0 | 4.0 | 4.0 | 4.0 | 4.0 | 2.5 | 1.5 |
| Styrene-butadiene block copolymer composition | Styrene-butadiene copolymer (wt. part) | | 100 | 100 | 100 | 100 | 100 | 100 | 100 | 100 | 100 | 100 | 100 |
| | Polystyrene (wt. part) | Mn = 400 | 25 | — | — | 10 | 55 | 25 | 30 | 15 | — | 15 | 30 |
| | | Mn = 3000 | — | 25 | — | — | — | — | — | — | — | — | — |
| | | Mn = 5000 | — | — | — | — | — | — | — | — | 30 | — | — |
| | | Mn = 6000 | — | — | 25 | — | — | — | — | — | 15 | 40 | 25 |
| | | Mn = 12000 | — | — | — | — | — | — | 25 | 15 | — | — | — |
| | | Mn = 25000 | — | — | — | — | — | — | — | — | — | — | — |
| Orientation conditions | Type | | Uniaxial | Uniaxial | Uniaxial | Uniaxial | Uniaxial | Biaxial | Uniaxial | Uniaxial | Uniaxial | Uniaxial | Uniaxial |
| | Temperature (°C.) | | 75 | 85 | 90 | 90 | 60 | 75 | 85 | 85 | 95 | 85 | 75 |
| | Rate (m/min) | | 1.0 | 1.0 | 1.0 | 1.0 | 1.0 | 5.0 | 1.0 | 1.0 | 1.0 | 1.0 | 1.0 |
| | Ratio (times) | | 3.5 | 3.5 | 3.5 | 3.5 | 3.5 | 3.5/3.5 | 3.5 | 3.5 | 3.5 | 3.5 | 3.5 |
| Physical properties of oriented film | Thickness (μ) | | 80 | 80 | 80 | 80 | 80 | 50 | 60 | 60 | 60 | 60 | 60 |
| | Tensile strength (kg/cm$^2$) | | 560 | 570 | 600 | 540 | 520 | 580/560 | 620 | 590 | 600 | 540 | 500 |
| | Tensile modulus (kg/cm$^2$) | | 19500 | 20000 | 21000 | 19000 | 18600 | 21800/22000 | 23500 | 21300 | 22200 | 18500 | 18300 |
| | Haze (%) | | 2 | 2 | 2 | 2 | 2 | 1 | 2 | 2 | 2 | 2 | 2 |
| | Dart impact strength (kg-cm/mm) | | 6 | 5 | 6 | 6 | 4 | 6 | 4 | 4 | 5 | 7 | 4 |
| | Heat shrinkage factor at 80° C. (%) | | 70 | 58 | 53 | 49 | 70 | 70 | 53 | 50 | 45 | 55 | 70 |

| | | Example | | | | | | |
|---|---|---|---|---|---|---|---|---|
| | | 37 | 38 | 39 | 40 | 41 | 42 | |
| Styrene-butadiene block copolymer | Polymer structure | (S—S)$_{77}$—Si (S—B)$_3$—S | [(S—B)$_{77}$]$_4$—Si | (B—S)$_3$ | (B—S)$_8$ | [(S—B)$_{77}$]$_4$—Si (S—B)$_3$—S | [(S—B)$_{77}$]$_4$—Si |
| | Styrene content (wt %) | 82 | 82 | 80 | 80 | 82 | 82 |
| | Mn of polystyrene block ($\times 10^{-4}$) | 2.0 | 2.0 | 4.0 | 1.5 | 2.0 | 2.0 |
| Styrene-butadiene block copolymer composition | Styrene-butadiene copolymer (wt. part) | 100 | 100 | 100 | 100 | 100 | 100 |
| | Polystyrene (wt. part) | 30 | 30 | 30 | 30 | 30 | 30 |
| | | — | — | — | — | — | — |
| | | — | — | — | — | — | — |
| | | 25 | 25 | 25 | 25 | 25 | 25 |
| Orientation conditions | Type | Uniaxial | Uniaxial | Biaxial | Biaxial | Biaxial | Biaxial |
| | Temperature (°C.) | 80 | 80 | 85 | 75 | 80 | 80 |
| | Rate (m/min) | 1.0 | 1.0 | 5 | 5 | 5 | 5 |
| | Ratio (times) | 3.5 | 3.5 MD/3.5 TD | 3.5 MD/3.5 TD | 3.5 MD/3.5 TD | 3.5 MD/3.5 TD | 3.5 MD/3.5 TD |
| Physical properties of oriented film | Thickness (μ) | 60 | 60 | 50 | 50 | 50 | 50 |
| | Tensile strength (kg/cm$^2$) | 540 | 560 MD/—TD | 630 MD/620 TD | 510 MD/490 TD | 560 MD/540 TD | 580 MD/570 TD |
| | Tensile modulus (kg/cm$^2$) | 19500 | 20300 MD/—TD | 24000 MD/24200 TD | 18100 MD/19000 TD | 20000 MD/20500 TD | 21000 MD/21800 TD |

TABLE 8-continued

| | | | | | | | Comparative Example | | |
|---|---|---|---|---|---|---|---|---|---|
| | | | | | | | 12 | 13 | 14 |
| Haze (%) | | 2 | 3 | 2 | 1 | 1 | 2 | | | |
| Dart impact strength (kg-cm/mm) | | 5 | 5 | 6 | 6 | 7 | 6 | | | |
| Heat shrinkage factor at 80° C. (%) | | 62 | 60 MD / TD | 55 MD / 53 TD | 70 MD / 70 TD | 61 MD / 59 TD | 62 / 58 | | | |
| Styrene-butadiene block copolymer | Polymer structure | | | | | | | (B—S)$_3$ | PS | B—S |
| | Styrene content (wt %) | | | | | | | 80 | 100 | 80 |
| | Mn of polystyrene block (× 10$^{-4}$) | | | | | | | 4.0 | 10.0 | 12.0 |
| Styrene-butadiene block copolymer composition | Styrene-butadiene copolymer (wt. part) | | | | | | | 100 | 100 | 100 |
| | Polystyrene (wt. part) | Mn = 400 | | | | | | — | 25 | 15 |
| | | Mn = 3000 | | | | | | — | — | — |
| | | Mn = 5000 | | | | | | — | — | — |
| | | Mn = 6000 | | | | | | — | — | — |
| | | Mn = 12000 | | | | | | — | — | 15 |
| | | Mn = 25000 | | | | | | 25 | — | — |
| Orientation conditions | Type | | | | | | | Uniaxial | Uniaxial | Uniaxial |
| | Temperature (°C.) | | | | | | | 100 | 120 | 125 |
| | Rate (m/min) | | | | | | | 1.0 | 1.0 | 1.0 |
| | Ratio (times) | | | | | | | 3.5 | 3.5 | 3.5 |
| Physical properties of oriented film | Thickness (μ) | | | | | | | 50 | 50 | 60 |
| | Tensile strength (kg/cm$^2$) | | | | | | | 630 | 680 | 670 |
| | Tensil modulus (kg/cm$^2$) | | | | | | | 23000 | 25500 | 24300 |
| | Haze (%) | | | | | | | 3 | 3 | 3 |
| | Dart impact strength (kg-cm/mm) | | | | | | | 4 | 1 | 1 |
| | Heat shrinkage factor at 80° C. (%) | | | | | | | 5 | 3 | <1 |

EXAMPLE 43

The uniaxially oriented films were prepared by using, as a base polymer, the same block copolymers or block copolymer compositions as those of Examples 3, 4, 11, 26 and 32. These block copolymers or block copolymer compositions had heat shrinkage factors at 80° C. in the orientation direction and the direction perpendicularly intersecting the orientation direction of 45% or more and 5% or less, respectively, tensile moduli in the orientation direction of 12,000 Kg/cm$^2$ or more and thicknesses of approximately 40 microns.

After letters and patterns were printed on the surfaces of these films, the films were seal processed to a cylindrical form in such a manner that the oriented direction was the circumferential direction and the non-oriented direction was the lengthwise direction. Thus, the heat shrinkable labels in the form of a cylinder were prepared.

The cylindrical cups molded from high-impact polystyrene were covered with the heat shrinkable labels obtained above and passed through a shrink tunnel having a controlled temperature of from 180° to 220° C., whereby the heat shrinking was effected. As a result, all these shrinkable labels were tightly adhered to the entire-surfaces of the cups to be wrapped, without causing loose and wrinkling portions thereon. These films were not readily released. Furthermore, the letters and patterns printed on the surfaces of the shrinkable labels were clearly finished on the surfaces of the cups, without causing any local deformation, and the deformation of the cups to be wrapped was not observed at all.

EXAMPLE 44

The uniaxially oriented film was prepared by using as a base polymer, the block polymer of Example 3 in the same manner as that of Example 1. After printing letters and patterns on the surfaces of the uniaxially oriented film, the film was cut into divided strips having a dimension of a length of 26 cm and a width (i.e. the orientation direction) of 30 cm and cylindrical heat shrinkable labels having a diameter of approximately 9 cm and a height of 30 cm were manufactured in such a manner that the oriented direction was the circumferential direction and the non-oriented direction was the lengthwise direction. A 1 l usual glass bottle having a maximum diameter of 8 cm and a height of 30 cm and having a thin top portion was covered with the heat shrinkable labels and heat shrunk at a temperature of 150° C. for 5 min in an oven. The bottle was covered with the film in such a manner that the outer periphery portion having a width of approximately 1 cm of the bottom surface of the bottle was covered after heat shrinking.

As a result, the shrinkable label was tightly adhered to the entire surface of the glass bottle without causing loose and wrinkling portions thereon and the letters and patterns printed on the surfaces of the shrinkable labels were clearly finished on the surfaces of the cups without causing any local deformation.

The glass bottle thus labelled was filled with carbonated beverage up to 85% of the total volume and plugged. Then, the bottle was dropped from the height of 75 cm onto concrete in such a condition that the bottle was horizontally laid down. Thus, the effect of the heat shrinkable label to prevent the scattering of broken pieces of the glass bottle was observed by using the labelled bottle and non-labelled bottle. As a result, 96% of the broken pieces of the labelled glass bottle remained within the circle having a radius of 0.5 m from the dropped point, whereas 70% or less of the broken pieces of the non-labelled glass bottle remained within the circle having a radius of 0.5 m from the dropped point. Thus, the heat shrinkable label obtained from the films according to the present invention has an excellent effect for preventing the scattering of broken pieces of glass bottles.

We claim:

1. An oriented film, sheet, or tube of a block copolymer having an excellent low-temperature shrinkage of not less than 15% in terms of a heat shrinkage factor at 80° C. in at least one direction, comprising, as a base polymer, a block copolymer or any mixture thereof (component (A)), said block copolymer having a melt flow of 0.001 through 70 g/10 min and having the following structure:

| | | |
|---|---|---|
| (a) | $(A-B)_n$ | $n = 2-10$ |
| (b) | $A(B-A)_n$ | $n = 2-10$ |
| (c) | $B(A-B)_n$ | $n = 2-10$ |
| (d) | $[(B-A)_m]_{n+2}X$ | $n = 2-10$ and $m = 1-10$ |
| (e) | $[(A-B)_m]_{n+2}X$ | $n = 2-10$ and $m = 1-10$ |
| (f) | $[(B-A)_m-B]_{n+2}X$ | $n = 1-10$ and $m = 1-10$, or |
| (g) | $[(A-B)_m-A]_{n+2}X$ | $n = 1-10$ and $m = 1-10$ | wherein A is an aromatic vinyl hydrocarbon polymer block having a number-average molecular weight of 10,000 through 70,000, B is a polymer block composed mainly of a conjugated diene, and X is a residual group of a coupling agent or a polyfunctional initiator such as an organo polylithium compound, the weight ratio of the aromatic vinyl hydrocarbon to the conjugated diene being 60:40 through 95:5.

2. A film, sheet, or tube as claimed in claim 1, wherein the base polymer is a block copolymer composition comprising 100 parts by weight of the component (A) and 5 to 100 parts by weight of a low-molecular weight aromatic vinyl hydrocarbon polymer or copolymer having a number-average molecular weight of not more than 20,000 (component (B)).

3. A film, sheet, or tube as claimed in claim 1, wherein the base polymer is a block copolymer composition comprising 100 parts by weight of the component (A), 5 through 100 parts by weight of the component (B), and 5 through 80 parts by weight of an aromatic vinyl hydrocarbon polymer or copolymer having a number-average molecular weight of not less than 30,000 (component (C)).

4. A film, sheet, or tube as claimed in claim 1, 2 or 3, wherein the component (A) is a block copolymer having the structure (a), (b), (c), (d), (e), (f), or (g) or any mixture thereof, wherein n in the structure (a) is 3 through 5, n in the structures (b) and (c) is 2 through 5, n in the structures (d) and (e) is 2 through 5, m in the structures (d) and (e) is 1 through 5, n in the structures (f) and (g) is 1 through 5, and m in the structures (f) and (g) is 1 through 5.

5. A film, sheet, or tube as claimed in claim 1, 2 or 3, wherein the component (A) is a block copolymer containing an aromatic vinyl hydrocarbon polymer block having a number-average molecular weight of 20,000 through 50,000.

6. A film, sheet, or tube as claimed in claim 1, 2 or 3, wherein the component (A) is a block copolymer having a weight ratio of the aromatic vinyl hydrocarbon to the conjugated diene of 70:30 through 85:15.

7. A film, sheet, or tube as claimed in claim 1, 2 or 3, wherein the component (A) is a block copolymer or a mixture thereof having a melt flow of 1 through 40 g/10 min.

8. A film, sheet, or tube as claimed in claim 1 or 2, wherein the tensile modulus in at least one direction is not less than 7,000 Kg/cm$^2$.

9. A film, sheet, or tube as claimed in claim 3, wherein the tensile modulus in at least one direction is not less than 10,000 Kg/cm$^2$.

10. A film, sheet, or tube as claimed in claim 2 or 3, wherein the component (B) is a low-molecular weight aromatic vinyl hydrocarbon polymer or copolymer having a number-average molecular weight of 300 through 6,000.

11. A film, sheet, or tube as claimed in claim 2 or 3, wherein the component (B) is a low-molecular weight polymer selected from the group consisting of polystyrene, a styrene-α-methyl styrene copolymer, a styrene-methylmethacrylate copolymer, and a styrene-acrylonitrile copolymer.

12. A film, sheet, or tube as claimed in claim 10, wherein the component (B) is a low-molecular weight polymer selected from the group consisting of polystyrene, a styrene-α-methyl styrene copolymer, a styrene-methylmethacrylate copolymer, and a styrene-acrylonitrile copolymer.

13. A film, sheet, or tube as claimed in claim 3, wherein the component (C) is an aromatic vinyl hydrocarbon polymer or copolymer having a number-average molecular weight of 80,000 through 500,000.

14. A film, sheet, or tube as claimed in claim 3 or 13, wherein the component (C) is a polymer selected from the group consisting of polystyrene, a styrene-α-methylstyrene copolymer, a styrene-methylmethacrylate copolymer, a styrene-acrylonitrile copolymer, and rubber modified high impact polystyrene.

15. A film, sheet, or tube as claimed in claim 1, 2 or 3, wherein the component (A) is a block copolymer derived from (i) butadiene, isoprene, or a mixture thereof and (ii) styrene.

16. A film, sheet, or tube as claimed in claim 1, 2 or 3, wherein the heat shrinkage factor at 80° C. in at least one direction is 20 through 90%.

17. A film, sheet, or tube as claimed in claim 1, 2 or 3, wherein the heat shrinkage factor at 80° C. in one direction is not less than 15% and in the direction perpendicularly intersecting said one direction is less than 15%.

18. A film, sheet, or tube as claimed in claim 1, 2 or 3, wherein the heat shrinkage factor at 80° C. in one direction is not less than 15% and in the direction perpendicularly intersecting said one direction is not less than 15%.

19. A heat shrinkable label comprising a film, sheet, or tube as claimed in claim 1, 2 or 3, wherein the heat shrinkage factor at 80° C. in one direction is not less than 15% and in the direction perpendicularly intersecting said one direction is less than 15% and the tensile strength in at least one direction is not less than 70,000 Kg/cm$^2$.

* * * * *